United States Patent Office 3,459,567
Patented Aug. 5, 1969

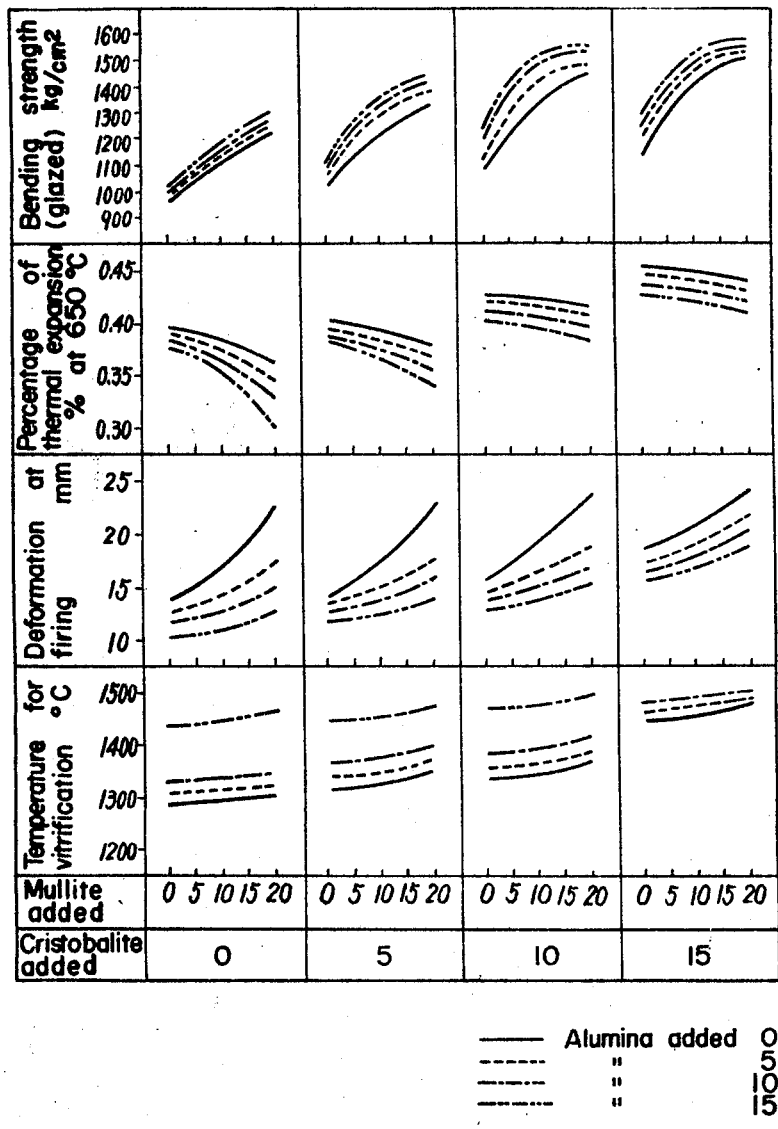

3,459,567
METHOD FOR PRODUCING PORCELAIN ARTICLES
Noboru Yamamoto and Noboru Niguchi, Nagoya, Japan, assignors to NGK Insulators, Ltd., Nagoya, Japan
Filed Nov. 8, 1965, Ser. No. 506,754
Claims priority, application Japan, Nov. 16, 1964, 39/64,330
Int. Cl. C04b 33/26
U.S. Cl. 106—46                                12 Claims

ABSTRACT OF THE DISCLOSURE

A porcelain article having higher mechanical strength than that of conventional porcelain articles is disclosed in which the crystalline phase of the porcelain body of the article comprises mullite, cristobalite, corundum, and quartz. A method for producing the porcelain articles is also disclosed wherein 3 to 15 parts by weight of mullite, 3 to 10 parts by weight of cristobalite, and 3 to 10 parts by weight of alumina are added as additives to 100 parts by weight of common porcelain batch mixed thoroughly and fired at a temperature between 1,200° to 1,450° C. so as to produce mulite, cristobalite, corundum, and quartz in crystalline phase in the fired porcelain body.

---

This invention relates to porcelain articles and a producing method therefor, more particularly the invention is intended to improve the mechanical strength of common porcelain bodies for high voltage porcelain insulators by providing new porcelain articles containing three extra ingredients comprising mullite, cristobalite, and alumina added to usual natural raw materials for common porcelain bodies consisting mainly of silexite or silica sand, feldspar, and clay.

The usual porcelain bodies for high voltage insulators have been of so-called feldspathic porcelains consisting mainly of quartz-feldspar-clay, which have been manufactured by mixing natural raw materials comprising silexite or silica sand, feldspar, and clay in such a ratio that the final chemical composition may, for instance, consists of 73% by weight of $SiO_2$, 21% by weight of $Al_2O_3$, 0.5% by weight of $Fe_2O_3$, 0.5% by weight of $TiO_2$, 0.5% by weight of $CaO$, 0.5% by weight of $MgO$, 1.5% by weight of $K_2O$, and 2.5% by weight of $Na_2O$, thereafter preparing with thus raw materials for shaping, drying and firing. The crystalline phase of thus fired porcelain consists of quartz, mullite, and cristobalite, and the remainder of non-homogeneous feldspathic glasses and clay glasses. In thus firing porcelain bodies, 30 to 50% by weight thereof is in crystalline phase and 50 to 70% by weight thereof is in glassy phase.

It has been known that as the content of crystalline phase in said common porcelain bodies is increased, the mechanical bending strength thereof tends to be increased. On the other hand, the ratio of natural raw materials for such porcelain bodies have been selected only from the standpoint of achieving a proper chemical composition in the final products. Accordingly, there has been a limitation in the percentage of crystalline phase in such common porcelain bodies due to the fact that a substantially constant content of crystalline phase is produced as a result of the chemical equilibrium of the raw materials even if various efforts are taken to obtain maximum content of crystalline phase such as checking the ratio of crystalline phase and glassy phase in the porcelain body during the firing process. Therefore, the maximum mechanical bending strength of such porcelain bodies obtained in the laboratory by using test specimens has been 1,300 $kg./cm.^2$ To improve the mechanical strength of feldspathic porcelain articles, so-called alumina porcelain have been studied with interest in recent years. Such alumina porcelain is produced by using about 20 to 60% alumina together with usual natural raw materials, however, if the content of alumina is increased, the firing temperature increases, resulting in an increased production cost, whilst if the alumina content is too low, the mechanical strength of the porcelain may not improve to a satisfactory extent. Such alumina porcelain also has a disadvantage in that the percentage of thermal expansion thereof is reduced because the addition of alumina reduces the quartz content in the raw material mixture for the porcelain.

The reason why the reduction in such porcelain bodies is undesirable is due to the following fact. In order to improve the mechanical strength of the porcelain article, certain quantity of glaze having a percentage of thermal expansion smaller than that of the porcelain body is usually applied on the body to cover entire surface thereof, thereby compressive internal-stress is produced within said glaze thus applied. If the percentage of thermal expansion of the porcelain body is reduced, the difference between said percentage of the porcelain body and the percentage of thermal expansion of the glaze is reduced due to the fact that there is a limit in reducing the percentage of thermal expansion of the glaze, and the magnitude of the compressive internal-stress in the glaze is reduced below a certain necessary level and hence it becomes impossible to obtain desired effects of increasing the mechanical strength of the porcelain articles. Sometimes, such mechanical strength of the porcelain articles is greatly reduced.

The principal object of the invention is to provide new porcelain articles having higher mechanical strength than that of usual common porcelain articles by adding three extra ingredients comprising 3 to 15 parts by weight of mullite, 3 to 10 parts by weight of cristobalite, and 3 to 10 parts by weight of alumina to 100 parts by weight of usual natural raw materials for common porcelain bodies. Thereby both the content of crystalline phase in the porcelain bodies and the effect of the compressive internal-stress in the glaze are increased.

In accordance with the method of the invention, mullite is added to usual feldspathic porcelain for increasing the mechanical strength thereof, and alumina is added thereto in a extent of keeping substantially same firing temperature in order to prevent firing deformation of the porcelain articles caused by said addition of mullite, and furthermore cristobalite is added thereto in order to prevent reduction in the percentage of thermal expansion of thus produced porce'ain articles due to addition of mullite and alumina. Thus, the effect of compression glaze in increasing the mechanical strength of the porcelain articles is utilized to the maximum extent.

For a better understanding of the invention, reference is taken to the accompanying drawing, in which the single drawing illustrates curves representing effects of simultaneous addition of mullite, cristobalite, and alumina to normal porcelain bodies, more particularly effects of crystals of such additives on the properties of porcelain bodies. The bending strength in the above curves was measured by taking test specimens of 12 mm. dia. and 100 mm. span and by increasing the bending load at a rate of 200 kg./min. The percentage of thermal expansion was measured on test specimens of 4 mm. dia. and 50 mm. long, with the rate of heating of 4° C./min. by using a differential thermal expansion meter having a reference sample made of fused quartz-glass. The firing deformation was determined by measuring deflection of the center point of each circular bar of 12 mm. dia. supported at two points spaced each other by 200 mm. The temperature for vitrification was determined by firing test specimens of 30 mm. dia. and 40 mm. long in a gas furnace according to a heating schedule consisting of 250° C./hr. for temperatures lower than 1,000° C. and 120° C./hr. for temperatures higher than 1,000° C. and then by measuring the firing temperature at which the water absorption of the specimens to be fired becomes zero.

The porcelain articles of the invention will now be explained in further detail.

Referring to the accompanying drawing, porcelain articles of the invention were prepared by adding simultaneously 0 to 20 parts by weight of mullite, 0 to 15 parts by weight of alumina, and 0 to 15 parts by weight of cristobalite to 100 parts by weight of usual raw materials comprising 73% by weight of $SiO_2$, 21% by weight of $Al_2O_3$, 0.5% by weight of $Fe_2O_3$, 0.5% by weight of $TiO_2$, 0.5% by weight of CaO, 0.5% by weight of MgO, 1.5% by weight of $K_2O$, and 2.5% by weight of $Na_2O$. The effects of crystals of each said additives on the properties of porcelain articles were measured. The results are shown in the curves of the single drawing.

It was found that the addition of mullite is effective in improving the bending strength of the porcelain articles, for instance, the bending strength of porcelain articles can be increased to a considerable extent by adding 15 parts by weight of mullite compared with that of usual porcelain articles having no mullite added thereto. On the other hand, the addition of mullite is liable to decrease the percentage of thermal expansion of the porcelain articles and to increase the deformation of the porcelain in the course of firing, whereby the obtained products tend to have distortion or deformation.

The addition of alumina is effective in improving the bending strength of the porcelain articles as in the case of adding mullite, and in addition, the deformation of the porcelain articles during firing process is greately reduced by adding alumina, thereby the distortion and deformation of the obtained products are prevented effectively. On the other hand, such addition of alumina has a disadvantage in that the percentage of thermal expansion of the porcelain is reduced and the temperature for vitrification is increased.

The addition of cristobalite is effective in improving the percentage of thermal expansion of porcelain bodies to a great extent. In order to increase mechanical strength of the obtained porcelain articles, glazing is usually provided on the surface of porcelain bodies by using a glaze having a percentage of thermal expansion smaller than that of the porcelain bodies so as to cause compressive internal-stress in the glaze after fired. If the percentage of thermal expansion of the porcelain body is reduced by the addition of one or both of mullite and alumna, then the dfference in percentage of thermal expansion between the porcelain body and the glaze applied thereon is reduced, and hence the magnitude of the compressive internal-stress in the glaze is also reduced, resulting in a loss of said strengthening effect by means of compression glaze. The addition of cristobalite is intended to prevent such reduction in the percentage of thermal expansion due to addition of mullite and alumina by maintaining the percentage of thermal expansion of the porcelain body within a suitable range. According to studies of the inventors, the proper range of the percentage of thermal expansion of the porcelain bodies is 0.35% to 0.60% at 650° C.

As described in the foregoing, each of the above three additives have different effects on the physical properties of the obtained porcelain articles. As a result of years of studies on the combined effects of crystals of said three additives and on the proper addition quantities thereof, the inventors found that if 3 to 15 parts by weight of mullite, 3 to 10 parts by weight of cristobalite, and 3 to 10 parts by weight of alumina are added simultaneously to 100 parts by weight of raw materials for common porcelain bodies to be fired at a temperature between 1,200 to 1,450° C. comprising 60 to 80% by weight of $SiO_2$, 10 to 30% by weight of $Al_2O_3$, 0.1 to 1.5% by weight of $Fe_2O_3$, 0.1 to 1.0% by weight of CaO, 0.1 to 1.0% by weight of MgO, 0 to 1.0% by weight of $TiO_2$, and less than 10% (excluding 0%) by weight of KNaO, then all disadvantages caused by adding any one of said additives one at a time are obviated and three additives thus added simultaneously act in a cumulative manner in improving the mechanical strength of the porcelain articles, thereby new porcelain articles having an excellent mechanical strength greatly exceeding that of usual common porcelain articles are obtained. In the above compositions of raw materials for porcelain bodies, what is meant by KNaO is the total quantity of one or both of $K_2O$ and $Na_2O$.

As described in the foregoing, the porcelain article of the invention can be achieved by adding simultaneously all three additives of mullite, cristobalite and alumina to the raw materials for usual porcelain bodies. In order to determine proper addition quantity of mullite, different quantities of mullite were added to mixtures consisting of 100 parts by weight of said raw materials for common porcelain bodies, 3 to 10 parts by weight of cristobalite, and 3 to 10 parts by weight of alumina, and it was found that the mechanical strength of the porcelain articles was not improved to a sufficient extent if the addition quantity of mullite was less than 3 parts by weight whilst the deformation of the porcelain article during firing process was increased excessively if the addition quantity of mullite was more than 15 parts by weight.

In order to determine the proper addition quantity of alumina, similar tests to the above were carried out by adding different quantities of alumina to mixtures consisting of 100 parts by weight of said raw materials for common porcelain bodies, 3 to 15 parts by weight of mullite, and 3 to 10 parts by weight of cristobalite, and it was found that if the addition quantity of alumina was less than 3 parts by weight, then not only the deformation of the porcelain articles during firing process could not be suppressed below an acceptable level but also the combined effects of mullite and alumina in improving the mechaincal strength of the porcelain articles was lost, whilst if the addition quantity of alumina was more than 10 parts by weight, then the temperature for vitrification was so raised as to necessitate firing of the porcelain bodies at a temperature above 1,450° C., which meant increased production cost.

In order to determine the proper range of addition quantity of cristobalite, similar tests to the above were carried out by adding different quantities of cristobalite to mixtures consistng of 100 parts by weight of said raw materials for normal porcelain bodies, 3 to 15 parts by weight of mullite, and 3 to 10 parts by weight of alumina, and it was found that if the addition quantity of cristobalite was less than 3 parts by weight, then the reduction of the percentage of thermal expansion due to addition of alumina and mullite could not be compensated sufficiently, resulting in an excessively low percentage of thermal expansion of the obtained porcelain bodies, whilst if the addition quantity of cristobalite was more than 10 parts by weight, not only the deformation of the porcelain articles during the firing process was increased greatly but also the temperature for vitrification of the porcelain articles was increased excessively.

The cristobalite to be added is for instance synthetic cristobalite manufactured by firing siliceous materials at a temperature above 1,200° C. The mullite to be added for instance synthetic mullite having a chemical composition similar to $3Al_2O_3 \cdot 2SiO_2$, which is manufactured by firing a raw materials mixture of siliceous material and alumina at a temperature higher than 1,500° C. or by melting the same by electric heating. The alumina to be added can be alumina materials for general use manufactured by the Bayer method. It is also permissible to use natural cristobalite, natural mullite and natural corundum.

The porcelain articles of the invention will now be numerically illustrated by way of examples.

Examples

Table 1 illustrates five examples of the porcelain bodies of the invention having different chemical compositions and Table 2 illustrates chemical and mineral compositions in percent by weight of raw materials used in examples of Table 1, wherein the reference character N refers to usual normal porcelain body compositions and S porcelain body compositions including additives according to the invention.

In each of the examples shown in Table 1, the bending strength was measured bp using test specimens of 12 mm. dia. and 100 mm. span and by increasing the bending load at a rate of 200 kg./min. The content of crystals was measured according to quantitative analysis based on the X-ray crystallography.

The mole ratio of the glaze composition applied on the surface of the porcelain article body consisted of 0.3 mole of $KNaO$, 0.7 mole of $CaO$, 0.6 mole of $Al_2O_3$, and 5.0 mole of $SiO_2$, and the percentage of thermal expansion of the glaze was 0.25% at 650° C.

In the chemical compositions of Tables 1 and 2, the total of chemical components except for the ignition loss was taken as 100%.

The electrical insulating strength of the porcelain bodies of Examples 1 to 5 expressed by withstand test voltage was in the range of 300 kv./cm. to 350 kv./cm., which was high enough for applying the porcelain bodies to high voltage insulators.

Judging from the physical properties of porcelain articles of the examples as shown in Table 1, it is apparent that in the porcelain bodies S prepared by adding synthetic mullite, synthetic cristobalite, and alumina, and provided with higher contents of crystals, and higher percentage of thermal expansion, compared with those of usual porcelain bodies N. Thereby the bending strength of the porcelain article of the invention after glazed is higher than that of the usual glaze porcelain articles by more than 30%.

The method of mixing ingredients of the procelain articles of the invention is similar to that of conventional feldspathic porcelain articles, however, for the sake of clarity, the process for mixing ingredients of Example S-4 will be described hereinafter.

The raw materials consisting of 37 parts by weight of Amakusa Pottery Stone, 26 parts by weight of Tsushima Feldspar, 13 parts by weight of synthetic mullite, 5 parts by weight of synthetic cristobalite, and 5 parts by weight of calcined alumina were milled and mixed with water in ball-mill. Then 20 parts by weight of Gaerome clay

TABLE 1

| Item | Example 1 | | Example 2 | | Example 3 | | Example 4 | | Example 5 | |
|---|---|---|---|---|---|---|---|---|---|---|
| | N-1 | S-1 | N-2 | S-2 | N-3 | S-3 | N-4 | S-4 | N-5 | S-5 |
| Raw material composition (in parts by weight): | | | | | | | | | | |
| Amakusa pottery stone | | | 30 | 30 | 35 | 35 | 37 | 37 | 45 | 45 |
| Ataka siliceous stone | 20 | 20 | 10 | 10 | | | | | | |
| Tsushima feldspar | 40 | 40 | 25 | 25 | 30 | 30 | 26 | 26 | 20 | 20 |
| Gaerome clay | 25 | 25 | | | 20 | 20 | 20 | 20 | 30 | 30 |
| Kibushi clay | 15 | 15 | 35 | 35 | 15 | 15 | 17 | 17 | 5 | 5 |
| Synthetic mullite | | 12 | | 5 | | 3 | | 13 | | 7 |
| Synthetic cristobalite | | 7 | | 5 | | 7 | | 5 | | 3 |
| Alumina | | 6 | | 3 | | 5 | | 5 | | 8 |
| Total | 100 | 125 | 100 | 113 | 100 | 115 | 100 | 123 | 100 | 118 |
| Chemical composition (in weight percent): | | | | | | | | | | |
| $SiO_2$ | 76.05 | | 75.75 | | 73.57 | | 73.19 | | 73.62 | |
| $Al_2O_3$ | 19.30 | | 19.23 | | 21.06 | | 21.64 | | 21.74 | |
| $Fe_2O_3$ | 0.67 | | 1.02 | | 0.87 | | 0.91 | | 0.82 | |
| $TiO_2$ | 0.30 | | 0.11 | | 0.31 | | 0.33 | | 0.23 | |
| $CaO$ | 0.21 | | 0.14 | | 0.19 | | 0.15 | | 0.13 | |
| $MgO$ | 0.22 | | 0.29 | | 0.16 | | 0.17 | | 0.08 | |
| $K_2O$ | 0.65 | | 1.54 | | 1.60 | | 1.66 | | 1.83 | |
| $Na_2O$ | 2.90 | | 1.92 | | 2.24 | | 1.95 | | 1.55 | |
| Total | 100.00 | | 100.00 | | 100.00 | | 100.00 | | 100.00 | |
| Temperature for vitrification (° C.) | 1,300 | 1,300 | 1,280 | 1,280 | 1,300 | 1,320 | 1,350 | 1,350 | 1,380 | 1,400 |
| Percentage of thermal expansion (percent, at 650° C.) | 0.35 | 0.39 | 0.37 | 0.40 | 0.41 | 0.43 | 0.43 | 0.47 | 0.50 | 0.53 |
| Crystals (in weight percent): | | | | | | | | | | |
| Mullite | 14.8 | 20.1 | 20.5 | 23.0 | 22.5 | 24.5 | 20.0 | 30.5 | 25.1 | 30.0 |
| Cristobalite | 15.2 | 18.5 | 17.3 | 19.5 | 23.0 | 25.0 | 25.5 | 28.0 | 35.0 | 36.5 |
| Quartz | 13.0 | 11.3 | 10.5 | 10.0 | 8.7 | 8.5 | 6.5 | 5.3 | 4.5 | 4.0 |
| Corundum | | 4.5 | | 2.0 | | 3.5 | | 3.0 | | 5.5 |
| Total | 43.0 | 54.4 | 48.3 | 54.5 | 54.2 | 61.5 | 52.0 | 66.8 | 64.6 | 76.0 |
| Bending strength (kg./cm.²): | | | | | | | | | | |
| Without glaze | 600 | 830 | 750 | 980 | 850 | 1,100 | 1,000 | 1,350 | 1,150 | 1,480 |
| With glaze | 720 | 1,100 | 930 | 1,300 | 1,050 | 1,400 | 1,200 | 1,630 | 1,300 | 1,900 |

TABLE 2

| Item | Chemical composition (in weight percent) | | | | | | | | | | Mineral composition (in weight percent) |
|---|---|---|---|---|---|---|---|---|---|---|---|
| | Ignition loss | $SiO_2$ | $Al_2O_3$ | $Fe_2O_3$ | $TiO_2$ | $CaO$ | $MgO$ | $K_2O$ | $Na_2O$ | Total | |
| Amakusa pottery stone | 2.72 | 78.82 | 14.11 | 0.79 | 0.15 | 0.04 | 0.05 | 3.25 | 0.22 | 100.15 | Quartz 62.8%, sericite 20.7%, kaolinite 15.7%, albite 0.8%. |
| Tsushima feldspar | 0.54 | 79.36 | 12.50 | 0.15 | 0.03 | 0.39 | 0.06 | 0.41 | 6.59 | 100.03 | Quartz more than 38%, albite 45%, sericite 17%. |
| Ataka siliceous stone | 0.36 | 96.88 | 1.57 | 0.18 | | | 0.12 | 0.24 | 0.23 | 99.58 | Quartz more than 96%. |
| Gaerome clay | 15.20 | 49.83 | 33.27 | 0.98 | 0.25 | 0.08 | 0.04 | 0.40 | 0.05 | 100.10 | Kaolinite 89.1%, quartz 10.9%. |
| Kibushi clay | 13.02 | 51.74 | 30.28 | 1.88 | 1.14 | 0.07 | 0.62 | 1.00 | 0.19 | 99.94 | Kaolinite 80.1%, quartz 19.9%. |
| Synthetic mullite | 0.40 | 29.23 | 68.13 | 0.29 | 1.18 | 0.15 | 0.07 | 0.25 | 0.30 | 100.00 | Mullite 97%, quartz 3%. |
| Alumina | 0.24 | 0.02 | 99.49 | 0.03 | | | | | 0.22 | 100.00 | Corundum more than 99%. |
| Synthetic cristobalite | 0.38 | 98.25 | 0.51 | 0.02 | 0.67 | 0.03 | 0.03 | 0.07 | 0.04 | 100.00 | Cristobalite 99%, quartz 1%. | and 17 parts by weight of Kibushi clay were added into thus prepared mixture to produce a homogeneous slip. The above synthetic cristobalite, mullite and alumina were powdered to the grain size of 325 mesh through mixing. The grain size of thus prepared mixture should be controlled in such a manner that more than 25 percent of the entire powdered particles in the slip may be of the particle size smaller than 10μ as measured by the Andreasen pippet method. The iron contained in thus prepared slip were removed by an electromagnetic filter and the slip was reduced water content by means of a filter press and made into cakes having 20 to 23% of water contents. The cakes were then kneaded thoroughly by a vacuum deairing pug mill to produce plastic bodies, which was then shaped into insulators by a certain shaping process.

Solid core insulators having a core diameter of 145 mm. were prepared by firing thus prepared porcelain bodies by utilizing reducing flames at 1,350° C., and measurements were taken on the cantilever bending strength of said solid core insulators which proved to be 1,200 kg./cm.².

The corresponding bending strength of conventional feldspathic porcelain insulators has been 800 kg./cm.² at most. Therefore, the bending strength of the solid core insulators of the invention is improved by about 50% compared with that of conventional solid core insulators of the same type.

As described in the foregoing, the porcelain bodies of the invention is provided with a mechanical strength at least 30% higher than that of usual porcelain bodies manufactured by using natural raw materials, thereby it is made possible to improve the quality of porcelain articles for high voltage insulators, which are required to have a specially high mechanical strength when applied to an electric power transmission line of large capacity. Thus, the invention contributes greatly to the art.

It will be appreciated that the invention is not limited to the embodiments disclosed in the foregoing hereinafter many modifications are possible for a person skilled in the art.

What we claim is:

1. A porcelain article having an excellent mechanical strength and whose porcelain body is fired from a batch which consists essentially of 100 parts by weight of common porelain batch consisting of 60 to 80% by weight of $SiO_2$, 10 to 30% by weight of $Al_2O_3$, 0.1 to 1.5% by weight of $Fe_2O_3$, 0.1 to 1.0% by weight of CaO, 0.1 to 1.0% by weight of MgO, less than 10% by weight of at least one of $K_2O$ and $Na_2O$, less than 1.0% by weight of $TiO_2$, and less than 5% by weight of the usual impurities, and 3 to 15 parts by weight of mullite, 3 to 10 parts by weight of cristobalite, and 3 to 10 parts by weight of alumina, wherein the crystalline phase of said procelain body comprises mullite, cristobalite, corundum, and quartz.

2. A porcelain article according to claim 1, wherein said porcelain body has a percentage of thermal expansion of at least 0.35% at 650° C.

3. A method for producing a porcelain article having excellent mechanical strength, which comprises adding 3 to 15 parts by weight of mullite, 3 to 10 parts by weight of cristobalite, and 3 to 10 parts by weight of alumina to 100 parts by weight of a common porcelain batch consisting of 60 to 80% by weight of $SiO_2$, 10 to 30% by weight of $Al_2O_3$, 0.1 to 1.5% by weight of $Fe_2O_3$, 0.1 to 1.0% by weight of CaO, 0.1 to 1.0% by weight of MgO, less than 10% by weight of at least one of $K_2O$ and $Na_2O$, less than 1.0% by weight of $TiO_2$, and less than 5% by weight of the usual impurities, mixing said common procelain batch and additives thoroughly, and firing the thus-prepared mixture so as to produce mullite, cristobilte, corundum, and quartz in crystalline phase in the fired porcelain body.

4. A method according to claim 3, wherein said firing is carried out at a temperature between 1,200° to 1,400° C.

5. A method for producing a porcelain article whose porcelain body has a percentage of thermal expansion of at least 0.35% at 650° C., which comprises adding 3 to 15 parts by weight of mullite, 3 to 10 parts by weight of cristobalite, and 3 to 10 parts by weight of alumina to 100 parts by weight of a common porcelain batch consisting of 60 to 80% by weight of $SiO_2$, 10 to 30% by weight of $Al_2O_3$, 0.1 to 1.5% by weight of $Fe_2O_3$, 0.1 to 1.0% by weight of CaO, 0.1 to 1.0% by weight of MgO, less than 10% by weight of at least one of $K_2O$ and $Na_2O$, less than 1.0% by weight of $TiO_2$, and less than 5% by weight of the usual impurities, mixing said common porcelain batch and additives thoroughly, and firing the thus-prepared mixture so as to produce mullite, cristobalite, corundum, and quartz in crystalline phase in the fired porcelain body.

6. A method according to claim 5, wherein said firing is carried out at a temperature between 1,200° to 1,450° C.

7. A porcelain electric insulator having an excellent mechanical strength, and whose porcelain body is fired from a batch which consists essentially of 100 parts by weight of a common porcelain batch consisting of 60 to 80% by weight of $SiO_2$, 10 to 30% by weight of $Al_2O_3$, 0.1 to 1.5% by weight of $Fe_2O_3$, 0.1 to 1.0% by weight of CaO, 0.1 to 1.0% by weight of MgO, less than 10% by weight of at least one of $K_2O$ and $Na_2O$, less than 1.0% by weight of $TiO_2$, and less than 5% by weight of the usual impurities, with 3 to 15 parts by weight of mullite, 3 to 10 parts by weight of cristobalite, and 3 to 10 parts by weight of alumina, wherein the crystalline phase of said porcelain body comprises mullite, cristobalite, corundum, and quartz.

8. An electric porcelain insulator according to claim 7, wherein said porcelain body has a percentage of thermal expansion of at least 0.35% at 650° C.

9. A method for producing a porcelain electric insulator having an excellent mechanical strength, which comprising adding 3 to 15 parts by weight of mullite, 3 to 10 parts by weight of cristobalite, and 3 to 10 parts by weight of alumina to 100 parts by weight of a common porcelain batch consisting of 60 to 80% by weight of $SiO_2$, 10 to 30% by weight of $Al_2O_3$, 0.1 to 1.5% by weight of $Fe_2O_3$, 0.1 to 1.0% by weight of CaO, 0.1 to 1.0% by weight of MgO, less than 10% by weight of at least one of $K_2O$ and $Na_2O$, less than 1.0% by weight of $TiO_2$, and less than 5% by weight of the usual impurities, mixing said common porcelain batch and additives thoroughly, and firing this prepared mixture so as to produce mullite, cristobalite, corundum, and quartz in crystalline phase in the fired porcelain body.

10. A method according to claim 9, wherein said firing is carried out at a temperature between 1,200° to 1,450° C.

11. A method for producing a porcelain electric insulator whose porcelain body has a percentage of thermal expansion of at least 0.35% at 650° C., which comprises adding 3 to 15 parts by weight of mullite, 3 to 10 parts by weight of cristobalite, and 3 to 10 parts by weight of alumina to 100 parts by weight of a common porcelain batch consisting of 60 to 80% by weight of $SiO_2$, 10 to 30% by weight of $Al_2O_3$, 0.1 to 1.5% by weight of $Fe_2O_3$, 0.1 to 1.0% by weight of CaO, 0.1 to 1.0% by weight of MgO, less than 10% by weight of at least one of $K_2O$ and $Na_2O$, less than 1.0% by weight of $TiO_2$, and less than 5% by weight of the usual impurities, mixing said common porcelain batch and additives thoroughly, and firing the thus-prepared mixture so as to produce mullite, cristobalite, corundum, and quartz in crystalline phase in the fired procelain body.

12. A method according to claim 11, wherein said firing is carried out at a temperature between 1,200° to 1,450° C.

References Cited

UNITED STATES PATENTS 2,017,056  10/1935  Easter _____ 106—65

2,045,318  6/1936  Stribeck _____ 106—46

HELEN M. McCARTHY, Primary Examiner

W. R. SATTERFIELD, Assistant Examiner

U.S. Cl. X.R.

106—65, 67

UNITED STATES PATENT OFFICE
CERTIFICATE OF CORRECTION

Patent No. 3,459,567　　　　　　　　　　　　　　　　August 5, 1969

Noboru Yamamoto et al.

It is certified that error appears in the above identified patent and that said Letters Patent are hereby corrected as shown below:

In the heading to the printed specification, line 4, "Niguchi" should read -- Higuchi --.

Signed and sealed this 3rd day of November 1970.

(SEAL)
Attest:

Edward M. Fletcher, Jr.　　　　　　　　　　　WILLIAM E. SCHUYLER, JR.
Attesting Officer　　　　　　　　　　　　　　　Commissioner of Patents